United States Patent
Gygax et al.

(10) Patent No.: US 10,063,268 B2
(45) Date of Patent: Aug. 28, 2018

(54) PORTABLE ELECTRONIC DEVICE SUPPORT

(71) Applicant: Logitech Europe S.A., Lausanne (CH)

(72) Inventors: Kim Gygax, Lausanne (CH); Yibo Shao, Tsuen Wan (HK); Li Lun Wen, Toufen Township (TW); Chien-Chang Lee, Bade (TW); Jacky Wu, Taipei (TW)

(73) Assignee: Logitech Europe S.A., Lausanne (CH)

( * ) Notice: Subject to any disclaimer, the term of this patent is extended or adjusted under 35 U.S.C. 154(b) by 123 days.

(21) Appl. No.: 14/679,354

(22) Filed: Apr. 6, 2015

(65) Prior Publication Data

US 2015/0288405 A1    Oct. 8, 2015

Related U.S. Application Data

(60) Provisional application No. 61/976,432, filed on Apr. 7, 2014.

(51) Int. Cl.
| | |
|---|---|
| *H04M 1/04* | (2006.01) |
| *H04B 1/3877* | (2015.01) |
| *H04M 1/12* | (2006.01) |
| *H04M 1/06* | (2006.01) |

(52) U.S. Cl.
CPC ............ *H04B 1/3877* (2013.01); *H04M 1/04* (2013.01); *H04M 1/06* (2013.01); *H04M 1/12* (2013.01)

(58) Field of Classification Search
CPC ...... H04B 1/3877; H04M 1/04; A47B 23/042; A47B 23/043; A47B 97/04; A47B 97/08; A47B 19/002

USPC ............ 248/445–458, 460, 461, 463, 206.5, 248/441.1, 444, 917, 919, 920–923; 361/679.55, 0.07, 0.56; 206/320
See application file for complete search history.

(56) References Cited

U.S. PATENT DOCUMENTS

| | | | | |
|---|---|---|---|---|
| 4,243,249 A | * | 1/1981 | Goss | B42F 9/001 108/43 |
| 7,281,698 B2 | * | 10/2007 | Patterson, Jr. | A45C 11/00 206/756 |
| 7,686,275 B2 | * | 3/2010 | Scarcello | A47G 1/24 248/231.91 |
| 7,744,055 B2 | * | 6/2010 | Zeng | F16M 13/00 248/447 |
| 7,836,623 B2 | * | 11/2010 | Wang | A47G 1/142 248/458 |
| 8,230,992 B2 | * | 7/2012 | Law | G06F 1/1626 206/320 |

(Continued)

OTHER PUBLICATIONS

Stein, Scott, "Targus Versavu Keyboard and Case for Apple iPad 2", (Aug. 4, 2011), from http://www.cnet.com/products/targus-versavu-keyboard-and-case-keyboard-and-folio-case-series/, (downloaded Apr. 6, 2015), 4 pages.

*Primary Examiner* — Nkeisha Smith
(74) *Attorney, Agent, or Firm* — Kilpatrick Townsend & Stockton LLP (57) ABSTRACT

In certain embodiments of the present invention, a portable electronic device support comprises a base, a frame, and a rotational mechanism, with the base including a front and a rear panel. The rotational mechanism is attached to the frame at a position offset from the center so that substantially the same viewing angle can be maintained after rotation from landscape to portrait orientation.

17 Claims, 7 Drawing Sheets

EXPLODED VIEW (56) References Cited

U.S. PATENT DOCUMENTS

| | | | | |
|---|---|---|---|---|
| 8,282,060 B2* | 10/2012 | Fan | F16M 11/041 | |
| | | | 248/121 | |
| 8,607,976 B2* | 12/2013 | Wu | G06F 1/1626 | |
| | | | 206/320 | |
| 8,708,140 B2* | 4/2014 | Liu | A45C 11/00 | |
| | | | 206/320 | |
| 8,720,843 B1* | 5/2014 | Chen | G06F 1/1613 | |
| | | | 206/305 | |
| 8,727,290 B1* | 5/2014 | De La Matta | F16M 11/40 | |
| | | | 248/122.1 | |
| 8,783,458 B2* | 7/2014 | Gallagher | F16M 11/105 | |
| | | | 206/320 | |
| 8,887,902 B1* | 11/2014 | Liu | G06F 1/1628 | |
| | | | 206/320 | |
| 8,925,722 B2* | 1/2015 | Poon | F16M 13/00 | |
| | | | 206/320 | |
| 9,131,756 B2* | 9/2015 | Hurst | A45C 13/1069 | |
| 2008/0055835 A1* | 3/2008 | Kumano | G06F 1/1601 | |
| | | | 361/679.07 | |
| 2008/0237432 A1 | 10/2008 | Patterson | | |
| 2011/0297566 A1* | 12/2011 | Gallagher | F16M 11/105 | |
| | | | 206/320 | |
| 2012/0012483 A1* | 1/2012 | Fan | F16M 11/10 | |
| | | | 206/320 | |
| 2012/0024918 A1 | 2/2012 | DeCamp et al. | | |
| 2012/0044638 A1* | 2/2012 | Mongan | A45C 11/00 | |
| | | | 361/679.55 | |
| 2012/0170212 A1* | 7/2012 | Gallouzi | F16M 11/041 | |
| | | | 361/679.56 | |
| 2012/0217174 A1* | 8/2012 | Ting | G06F 1/1628 | |
| | | | 206/45.2 | |
| 2012/0268891 A1* | 10/2012 | Cencioni | G06F 1/1626 | |
| | | | 361/679.55 | |
| 2013/0083465 A1* | 4/2013 | Motoishi | G06F 1/1613 | |
| | | | 361/679.21 | |
| 2014/0221058 A1* | 8/2014 | Jand | A45C 11/00 | |
| | | | 455/575.8 | |
| 2015/0041622 A1* | 2/2015 | Mulhern | F16M 11/041 | |
| | | | 248/688 | |
| 2015/0136933 A1* | 5/2015 | Merzon | G06F 1/1626 | |
| | | | 248/450 | |

\* cited by examiner

EXPLODED VIEW

FIG. 3

CENTER SHIFT DRAWING

FIG. 4

BASE AND LANDSCAPE VIEW

FIG. 5

BASE AND PORTRAIT VIEW

FIG. 6

BASE ISO VIEW

FIG. 7

BASE LANDSCAPE SIDE VIEW

FIG. 8

BASE PORTRAIT SIDE VIEW

FIG. 9

FRAME ISO VIEW

FIG. 10

FRAME SIDE VIEW
FIG. 11

FRAME TOP VIEW
FIG. 12

FIG. 13

US 10,063,268 B2

PORTABLE ELECTRONIC DEVICE SUPPORT

CROSS-REFERENCES TO RELATED APPLICATIONS

This application is a nonprovisional of and claims the benefit of priority of U.S. Provisional Application No. 61/976,432, entitled, "Portable Electronic Device Support," filed on Apr. 7, 2014, which is herein incorporated by reference in its entirety for all purposes.

BACKGROUND

A portable electronic device, such as a tablet computer or smart phone, often uses a case for protection or support. Some portable electronic device cases are classical and provide only a cover or shell function which can provide protection. Other portable electronic device cases provide for holding or support in different configurations or multiple viewing angles.

Supports that provide multiple viewing configurations, such as landscape and portrait, often suffer from limited or restricted angles, or they tilt with respect to a support surface. Thus, there is a need to provide a portable electronic device support which can be used and optimized in landscape and portrait orientations of operation.

BRIEF SUMMARY

According to certain embodiments of the invention, a portable electronic device support includes a base, a frame, a rotational mechanism, where the base includes a front panel and a rear panel, and the frame is coupled to the base through the rotational mechanism on the rear panel of the base, with the front panel configured to rest on a desktop or other surface and support the edge of the frame. The frame is rectangular, not square. A rotational mechanism is coupled to the rear side of frame so that frame can be rotated to view the electronic device in either a portrait or landscape orientation. The rotational mechanism is attached to the frame at a position offset from the center so that substantially the same viewing angle can be maintained after rotation from one orientation to the other. In one embodiment, the center of the rotational mechanism is shifted along both the X and Y axis from the center of the frame. The point of attachment of the rotational mechanism to the base is shifted off center along the X axis the same amount, in the same direction, so that the frame is still centered about the X axis of the base in both landscape and portrait orientation, even with the rotational mechanism not being centered.

It is advantageously possible to rotate a portable electronic device 90 degrees from one orientation and another orientation, i.e., from a portrait to a landscape orientation or from a landscape to a portrait orientation, so that the center of the portable electronic device is not shifted laterally between the two positions.

According to certain embodiments, for a frame that holds an electronic device that measures approximately 169.5 mm×240 mm, the center of the rotational mechanism may be shifted 17 mm in both the X axis and Y axis relative to the center of the frame. In some implementations, the base includes a groove or other mechanism to hold the frame of the portable electronic device at a constant viewing angle of about 70 degrees relative to the base, in both a portrait and landscape configurations. The frame can be configured such that it rotates with a 360 degrees rotation relative to the base.

BRIEF DESCRIPTION OF THE DRAWINGS

Certain embodiments of the invention is now described, by way of example, with reference to the accompanying drawings. The specific nature of the following description should not be construed as limiting in any way the broad nature of this summary.

In order that the manner in which the above recited and other advantages and features of the invention are obtained, a more particular description of the invention briefly described above will be rendered by reference. Notwithstanding any other forms that may fall within the scope of the present invention, preferred forms of the invention will now be described, by way of example only, with reference to the accompanying drawing in which.

DETAILED DESCRIPTION

The present application relates to the field of portable electronic device support, and more specifically to a portable electronic device support able to provide both landscape and portrait viewing orientations.

Figure 1:
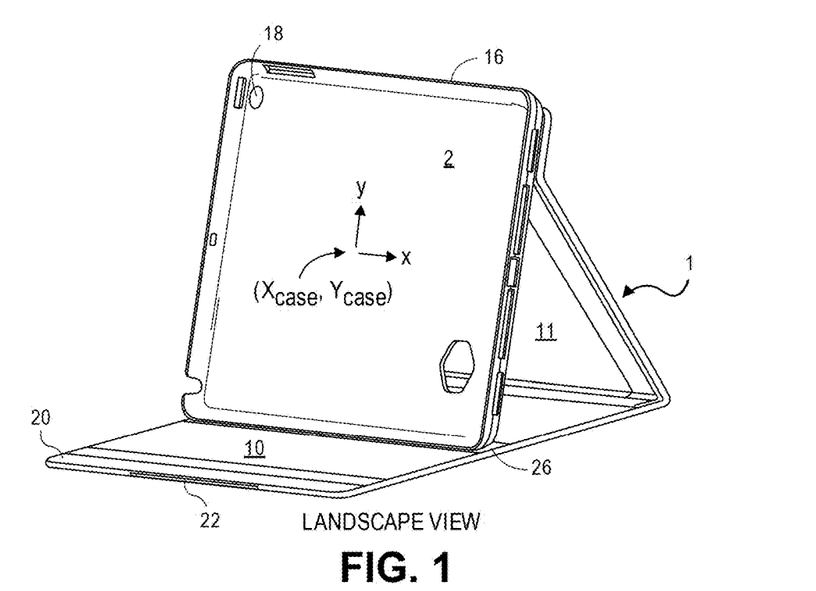
FIG. 1 schematically shows a view of a portable electronic device support in a landscape orientation, according to certain embodiments of the invention.

Referring to FIG. 1, a portable electronic device support comprises a support or base 1 and a frame 2. The base 1 comprises a front side 10 and a rear side 11. The frame 2 is adapted to surround an attachable and detachable portable electronic device, not represented, such as a tablet or smart phone, and is rotationally coupled to the rear side 11 of the base 1 through a rotational mechanism, such as a hinge bar, 21 as represented on FIG. 3. The rotational mechanism 21 coupled to the rear side 11 of the portable electronic device support is configured to allow the frame 2 to rotate from a first position to a second position.

FIG. 1 also shows a portion 12 of rear side 11 which can rotate backward about an axis 14. In one embodiment, back side 11 is formed with a stiff internal layer covered by external soft, flexible layers, such as polyurethane. By eliminating the stiff layer in the area of axis 14, the ability to bend portion 12 backward is provided.

In a similar manner, a depression 26 is formed to provide a slot for the bottom of the frame to rest against. By only including the internal stiffener on either side of depression 26, the flexible cover depresses and forms a shallow slot to support the bottom of frame 2 to keep it from slipping. Additionally, the resilient cover can be a material which provides sufficient friction to support the bottom of frame 2 without slipping at other locations.

Frame 2 includes perimeter walls 16, which allow the electronic device, such as a tablet, to be press fitted into the frame. Frame 2 includes an opening 18 for a camera lens on the electronic device. The rotational mechanism is attached so that, upon a clockwise rotation, the electronic device moves from landscape to portrait orientation, with substantially the same viewing angle, and with the camera opening 18 remaining at the top (in the upper right in the portrait orientation).

In one embodiment, a flap 20 extends from the front of front side 10. When the device support is closed, it forms a case for the electronic device, and flap 20 folds around the edge of the frame 2 to engage the backside of portion 12. Flap 20 includes a metal strip 22 for engaging magnets attached to the backside of portion 12, or imbedded in portion 12 (not shown, but shown as magnets 24 in FIG. 3.

Figure 2:
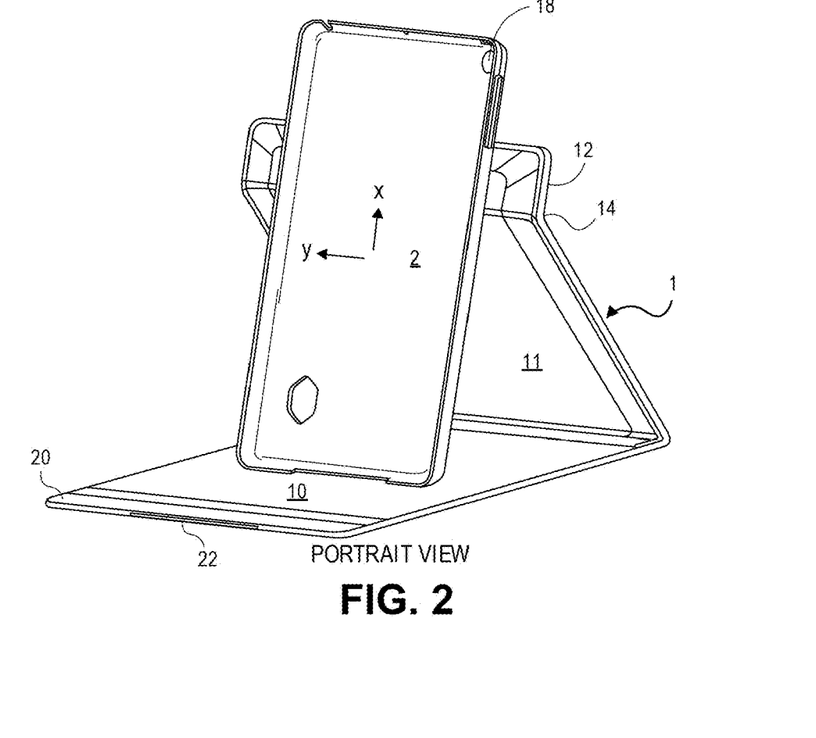
FIG. 2 schematically shows a view of the portable electronic device support in a portrait orientation, according to certain embodiments of the invention.

FIG. 2 shows the frame 2 rotated to a portrait position. The same angle of about 70 degrees is maintained, and the camera lens hole 18 remains at the top. As can be seen from the X, Y axes drawn on FIG. 2, the center of the rotational mechanism is shifted along both the X and Y axis from the center of the frame. The point of attachment of the rotational mechanism to the base is shifted off center along the X axis the same amount, in the same direction, so that the frame is still centered about the X axis of the base in both landscape and portrait orientation, even with the rotational mechanism not being centered.

In some embodiments, frame 2 is able to provide a full 360 degrees rotation of relative to the base. It will be well understood by those of ordinary skill in the art that this portable electronic device support is not a limited example. Any other portable electronic device support allowing rotation from one orientation to another orientation is also suitable, e.g., 90 degrees rotation or 180 degrees rotation. It will be also well understood that the form and the nature of the fixation of hinge bar 21 (rotational mechanism) is not a limited example and any other rotational mechanism which can provide a rotational function of frame 2 relative to base 1 may be used. Therefore any rotational mechanism suitable for providing a 360 degree rotation or less of the frame about the rotational axis may be used, as would be understood by one of ordinary skill in the art.

Figure 3:
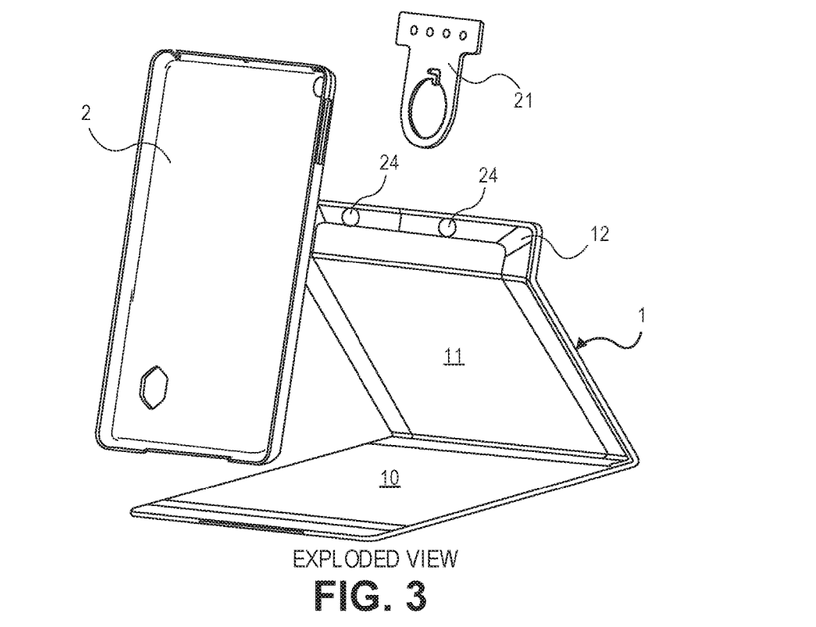
FIG. 3 schematically shows a view of the portable electronic device support in an exploded view of the landscape orientation, according to certain embodiments of the invention.

FIG. 3 shows hinge bar 21 with four holes for receiving screws or rivets or other fasteners to attach to a top edge of portion 12 of the backside 11 of base 1. Also shown are two magnets 24 for holding bar 22 of FIG. 1 when the case is closed.

Figure 4:
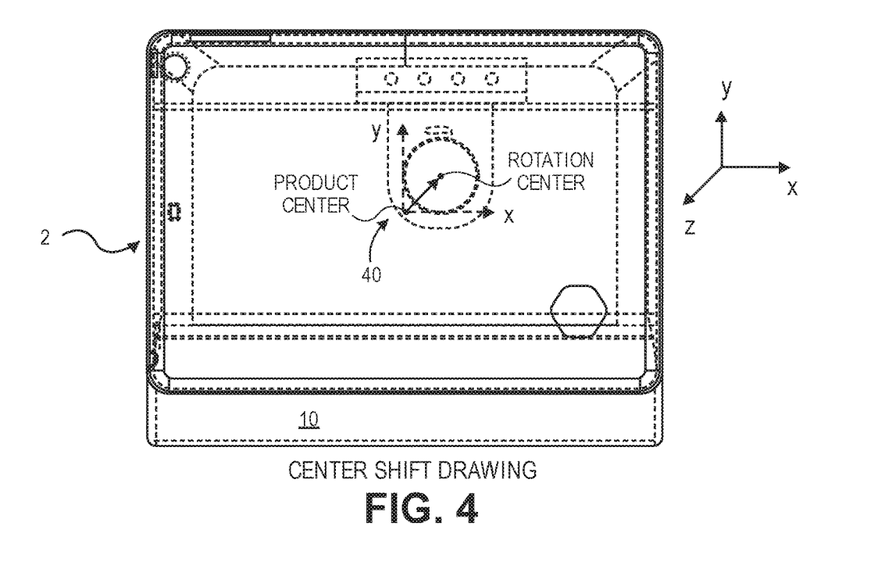
FIG. 4 schematically shows a front view of the portable electronic device support in a portrait landscape orientation, according to certain embodiments of the invention.

As shown on FIG. 4, the portable electronic device support is in a portrait orientation, the rotational mechanism includes hinge bar 21 fixed to rear side 11 of the portable electronic device support so that its center (Xcase, Ycase) is displaced along both the X axis and Y axis, creating the same angle when frame 2 or the portable electronic device inserted in the frame is in its vertical (portrait) or horizontal (landscape) orientation. It is advantageously possible to rotate a portable electronic device 90 degrees from one orientation and another orientation, i.e., from a portrait to a landscape orientation or from a landscape to a portrait orientation, so that the center of the portable electronic device is not shifted laterally between the two positions.

According to certain embodiments, for a frame that holds an electronic device that measures approximately 169.5 mm×240 mm, the center of the rotational mechanism may be shifted 17 mm in both the X axis and Y axis relative to the center of the frame. In some implementations, the base includes a groove or other mechanism to hold the frame of the portable electronic device at a constant viewing angle of about 70 degrees relative to the base, in both a portrait and landscape configurations. The frame can be configured such that it rotates with a 360 degrees rotation relative to the base.

In some embodiments, the shift distance X is the same as Y so that the face of the frame is still in the center after rotating 90 degrees, for example, from a landscape orientation to a portrait orientation. When fixed in the frame, the portable electronic device then also raises up when rotated from horizontal to vertical. Therefore all possible shift distances are located on an axis forming +/−45 degrees with the X axis.

In further embodiments of the invention, hinge bar 21 (rotational mechanism) makes the rotation axis shift 17 mm both in the X and Y direction, so that the frame 2 in the portrait orientation, as shown in FIG. 4, is able to stand up around 70 degrees relative to the base 1. Other standing angles relative to base 1 are possible, as would be appreciated by one of ordinary skill in the art. The angle of the frame relative to the front side (or bottom support) of the base may thus be configured to different angles by altering the shift of the rotational mechanism, while not necessarily requiring a change in the dimensions of the base or frame. It is thus advantageously possible to use a portable electronic device mounted in the frame for video calls as the camera is able to be angled appropriately for viewing a user's face. Advantageously, suitable angles may be chosen between 60 and 80 degrees for properly viewing a user's face. The desired angle may depend on one or more of the dimensions of the frame, base, portable electronic device, properties of the camera, and the position of the camera on the portable electronic device. Thus, embodiments with ranges outside of 60-80 degrees are possible.

In some implementations, in a closed position, front side 10 is adapted to protect a screen of a portable electronic device when it is inserted in frame 2. In an open position, the frame and the portable electronic device are able to rotate in one or more directions relative to base 1, along a rotating axis Z and to be seated on the base 1, either in a portrait or landscape orientation. Therefore, in certain embodiments, there is no need for a supplementary hinge on the front side of base 1 for positioning frame 2 and the portable electronic device on base 1.

Embodiments of the invention may alter the form factor of the portable electronic device support. For example, if the angle of the back of the base is fixed relative to the frame, such as by a stiff hinge or other locking mechanism, then the bottom of the base may be reduced in size or eliminated. Further, in embodiments of the invention, the base of the portable electronic device support may include input devices, such as a keyboard, for use with a portable electronic device mounted in the frame.

In further embodiments, the frame of the portable electronic device support may be configured to generally surround the sides and back of a portable electronic device mounted in it. Alternatively, the frame may only surround or cover a portion of a mounted portable electronic device. For example, it may grip a portable electronic device by the sides and top edge. The back portion of the frame may also only cover a portion of the back of a mounted electronic device.

In certain embodiments, the rotating mechanism may be fixed to the frame and base portions of the portable electronic device support. In alternate embodiments, the rotating mechanism may come apart into at least two portions, one of which remains affixed to the frame and the other which remains affixed to the base. For example, a male portion of the rotating mechanism may be affixed to the frame, and a female portion of the rotating mechanism may be affixed to the base. In some cases, a portion of the rotating mechanism may be directly affixed or incorporated into a portable electronic device. The portable electronic device may then be directly coupled to the base via the rotating mechanism. Again, the rotating mechanism may be one piece, or may be two pieces that can be selectively coupled together. The rotating mechanism may be glued, welded, or otherwise affixed to a portable electronic device such that it can support the portable electronic device when in use with the portable electronic device support.

In some embodiments, there may be a slot, groove, magnet, or other fixed positioning mechanism built into the bottom of the base, such that the lower edge of the frame or portable electronic device contacts the base at a specific position on the base. If the lower edge of the frame or portable electronic device contacts the same general location of the base in both landscape and portrait positions, then the displacement of the center of the rotating mechanism can be used to control the angle of a mounted portable electronic device in the two positions. In further embodiments, the same (or substantially similar) angle relative to the base or a support surface can be created for a mounted portable electronic device in both the portrait and landscape orientations. Alternately, specific angles for the landscape and portrait orientations may be configured.

Shifting the center of rotation, as disclosed in various embodiments herein, may enable a user to quickly and easily change the viewing orientation from portrait view to landscape view or vice versa while engaged in video calls. There is no need for the user to rotate and to select a suitable viewing angle so that he still can use the video mode. The user is able to begin a call with a landscape orientation and rotate the portable electronic device in a portrait orientation while keeping his face in the center of the captured image continuously.

It would be appreciated by one of ordinary skill in the art that such portable electronic device support is also suitable for any other portable electronic device, such as a mobile phone, smart phone, tablet computer, notebook, and the like.

Example Embodiments

Figure 5:
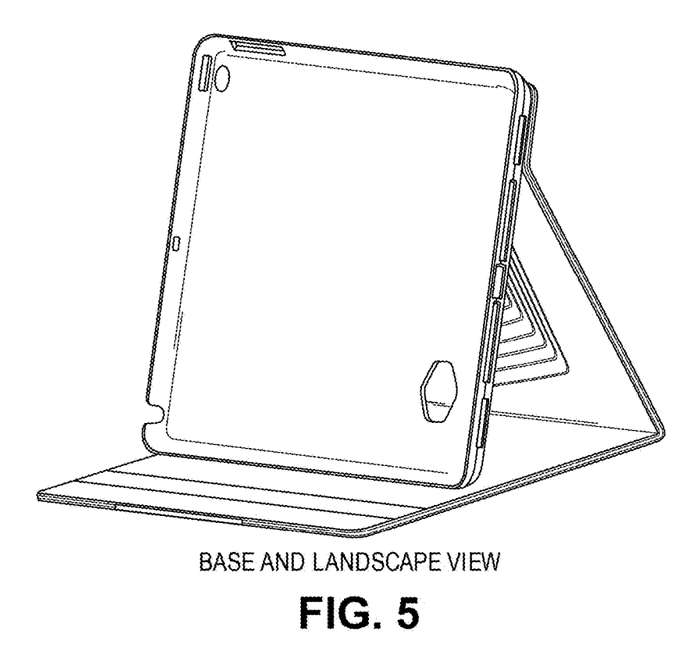
FIG. 5 illustrates a simplified diagram depicting a base of a portable electronic device support configured in a landscape orientation, according to certain embodiments of the invention.
Figure 6:
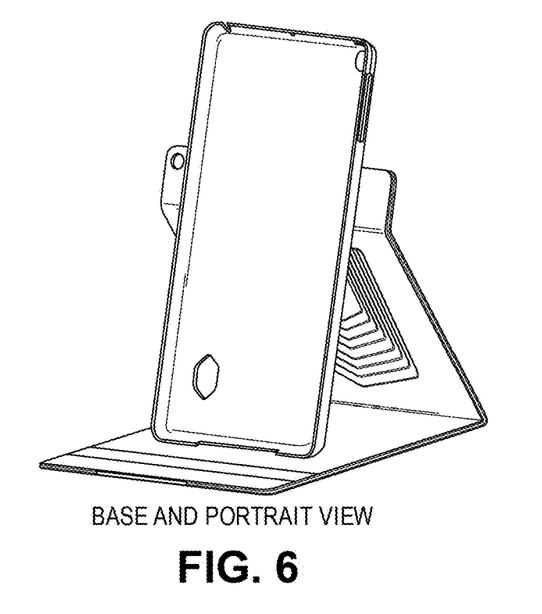
FIG. 6 illustrates a simplified diagram depicting a base of a portable electronic device support configured in a portrait orientation, according to certain embodiments of the invention.
Figure 7:
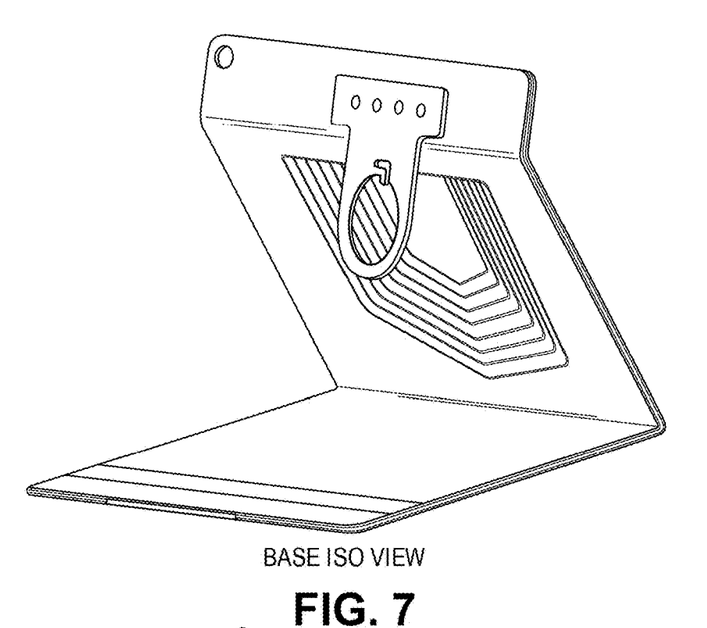
FIG. 7 illustrates a simplified diagram depicting an isometric view of a base of a portable electronic device support, according to certain embodiments of the invention.
Figure 8:
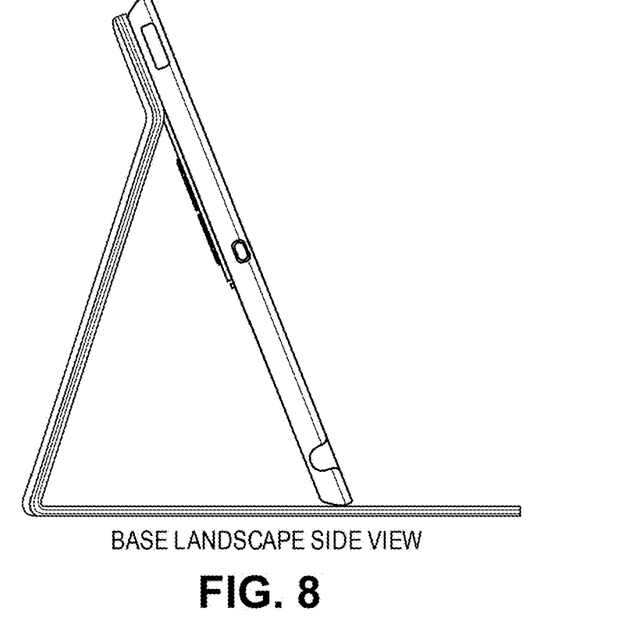
FIG. 8 illustrates a simplified diagram depicting a side view of a base landscape for a portable electronic device support, according to certain embodiments of the invention.
Figure 9:
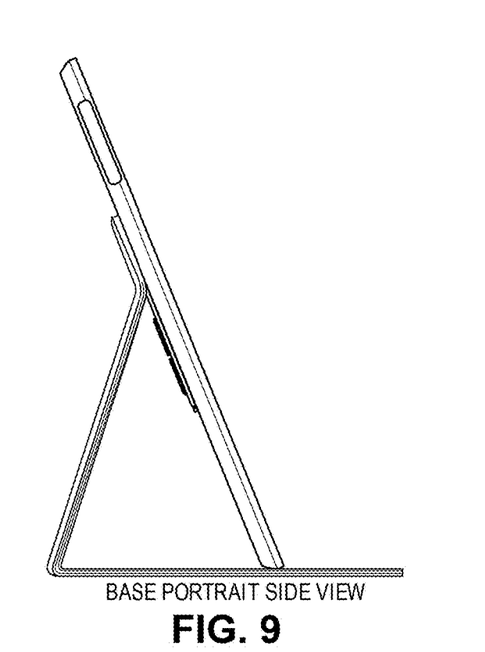
FIG. 9 illustrates a simplified diagram depicting a side view of a portable electronic device support configured in a portrait orientation, according to certain embodiments of the invention.
Figure 10:
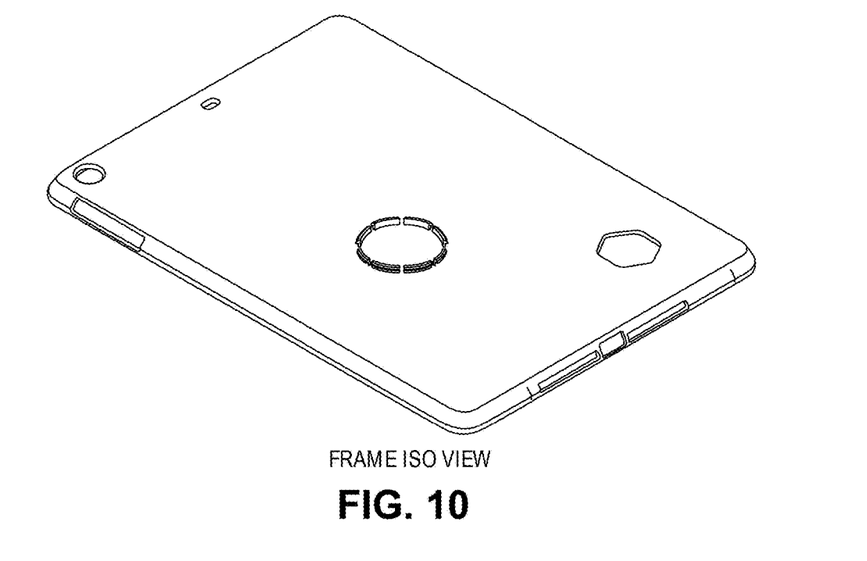
FIG. 10 illustrates a simplified diagram depicting an isometric view of a frame of a portable electronic device support, according to certain embodiments of the invention.
Figure 11:
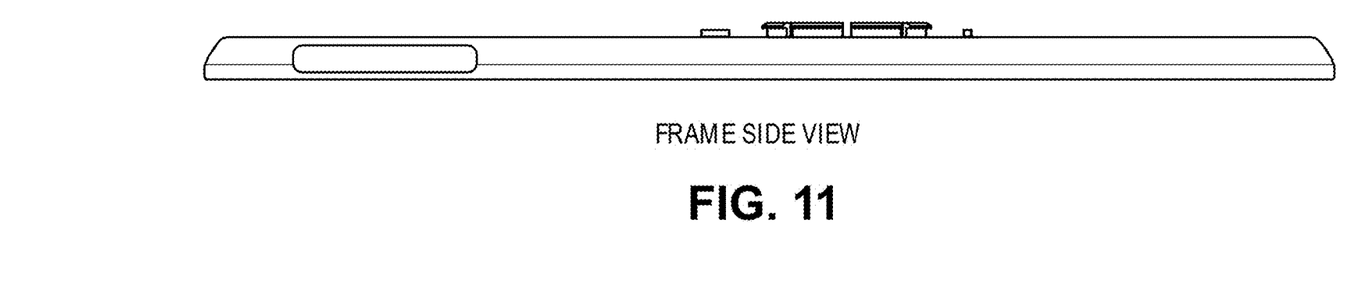
FIG. 11 illustrates a simplified diagram depicting a side view of a frame of a portable electronic device support, according to certain embodiments of the invention.
Figure 12:
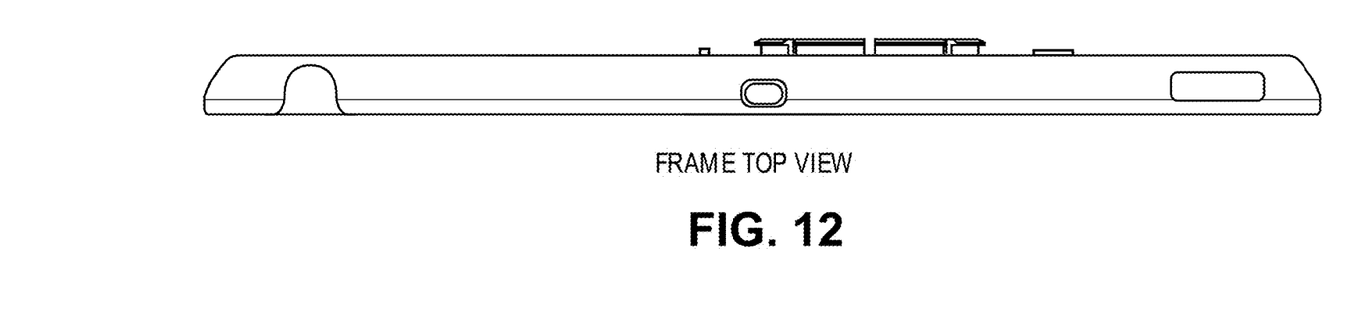
FIG. 12 illustrates a simplified diagram depicting a top view of a frame for a portable electronic device support, according to certain embodiments of the invention.

FIGS. 5-6 illustrates simplified diagrams depicting a base of a portable electronic device support configured in a landscape orientation and portrait orientation, respectively, according to certain embodiments of the invention. FIGS. 7-9 illustrate simplified diagrams depicting various views of a base for a portable electronic device support, according to certain embodiments of the invention. FIGS. 10-12 illustrate simplified diagrams depicting various views of a frame for a portable electronic device support, according to certain embodiments of the invention.

Figure 13:
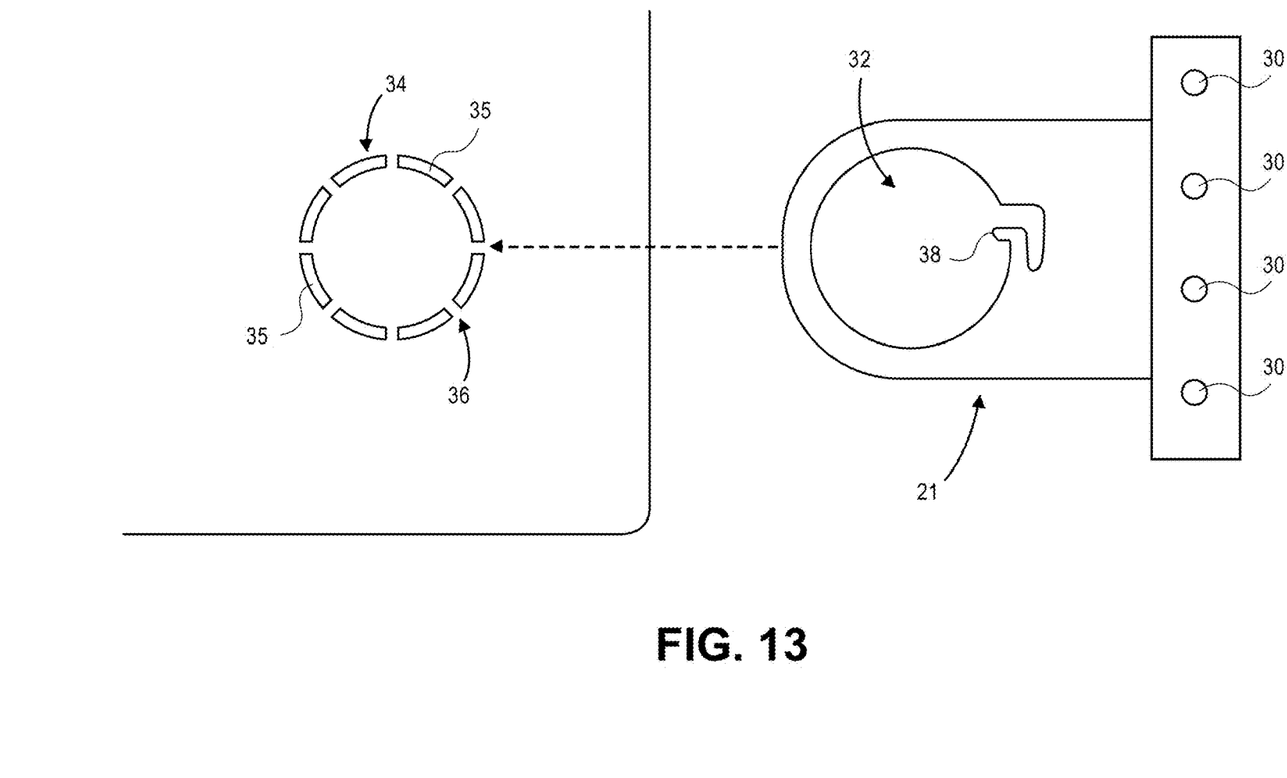
FIG. 13 illustrates a simplified diagram depicting the assembly of the rotational mechanism according to an embodiment of the invention.

FIG. 13 illustrates the assembly of the rotational mechanism. Hinge bar 21 includes four holes 30 for fasteners as described above. A hole 32 is sized to press-fit around a connector 34 on the back of frame 2. In one embodiment, as shown, connector 34 is a series of curved, raised ridges 35 with gaps in-between, such as gap 36. The ridges can be formed integrally with frame 2. An arm 38 is movable, and can engage slots 36 as the frame is rotated, to engage at different angles. In the embodiment shown, arm 38 can engage every 45 degrees to hold the frame at that angle. Arm 38 can be formed of the same piece as hinge bar 21, and be made of a hard plastic material.

It will be well understood that such portable electronic device support is also suitable for any other portable electronic device, such as a mobile phone, notebook, etc. Further, a fixed device, such as a display, may be mounted within the support and remain within the scope of the invention.

What is claimed is:

1. A portable electronic device support comprising:
   a base having a front panel and a back panel;
   a frame for a portable electronic device; and
   a rotational mechanism coupling the frame to the back panel of the base, wherein the rotational mechanism is coupled to the back panel so that a single axis of rotation of the frame is at a position offset from a center of the frame so that a center of the rotational mechanism is shifted along both an X and a Y axis of the frame from the center of the frame, the rotational mechanism providing for rotation of the portable electronic device from a landscape orientation to a portrait orientation;
   wherein the front panel of the base includes a mechanism to hold the frame at a constant viewing angle relative to the front panel of the base, in both portrait and landscape orientations;
   wherein the rotation mechanism comprises
   a first part coupled to a back side of the frame; and
   a second part coupled to a top portion of the back panel, such that the first and second parts engage with each other to couple together and allow rotation relative to each other.

2. The portable electronic device support of claim 1 wherein the frame is still centered about an X axis of the base in both landscape and portrait orientations, even with the rotational mechanism not being centered.

3. The portable electronic device support of claim 1 wherein the mechanism to hold the frame at a constant viewing angle holds the frame at an angle of between 60-80 degrees relative to the front panel of the base, in both portrait and landscape orientations.

4. The portable electronic device support of claim 3 wherein the mechanism to hold comprises a groove in the front panel of the base.

5. The portable electronic device support of claim 1 wherein the support also comprises a case, with the back panel folding with respect to the front panel so that the electronic device is held in-between, and further comprising a latch for securing open ends of the front and back panels together.

6. The portable electronic device support of claim 1 wherein the frame is configured to couple to the portable electronic device.

7. The portable electronic device support of claim 1 wherein the frame is integral to the portable electronic device.

8. The portable electronic device support of claim 1 wherein the frame is the portable electronic device.

9. The portable electronic device support of claim 1 wherein the frame comprises a hard plastic, and said front and back panels comprise resilient material with an internal stiffener.

10. The portable electronic device support of claim 1 wherein a center of rotational mechanism is shifted 17 mm in both directions X and Y relative to the center of the frame.

11. The portable electronic device support of claim 1 wherein the frame of said portable electronic device support is set at a constant viewing angle of 70 degrees in both landscape and portrait orientation.

12. The portable electronic device support of claim 1 wherein the frame rotates with a 360 degrees rotation relative to the base.

13. A portable electronic device support comprising:
a base having a front panel and a back panel;
a rectangular frame for a portable electronic device;
a rotational mechanism coupling the frame to the back panel of the base, wherein the rotational mechanism is coupled to the back panel at a position offset from a center of the frame so that a center of the rotational mechanism is shifted along both an X and a Y axis of the frame from a center of the frame;
wherein the center of the rotational mechanism is equally offset from the center of the frame along both the X axis and the Y axis of the frame;
wherein a point of attachment of the rotational mechanism to the back panel is shifted off the center of the frame so that the frame is still centered about the X axis of the base in both landscape and portrait orientations, even with the rotational mechanism not being centered;
wherein the front panel of the base includes a mechanism to hold the frame at a constant viewing angle of between 60-80 degrees relative to the front panel of the base, in both portrait and landscape orientations;
wherein the support also comprises a case, with the back panel folding with respect to the front panel so that the electronic device is held in-between, and further comprising a latch for securing open ends of the front and back panels together; and
wherein the frame is configured to couple to the portable electronic device.

14. The portable electronic device support of claim 13 wherein the mechanism to hold comprises a groove in the front panel of the base.

15. The portable electronic device support of claim 13 wherein the rotation mechanism comprises a first part coupled to a back side of the frame; and
a second part coupled to a top portion of the back panel, such that the first and second parts engage with each other to couple together and allow rotation relative to each other.

16. The portable electronic device of claim 15 wherein:
one of the first part and the second part of the rotational mechanism comprises a broken ring of raised walls having gaps therebetween; and
the other of the first and second part of the rotational mechanism comprises a ring adapted to engage the ring of raised walls, and including a movable arm for engaging the gaps of the broken ring, to fix the frame at a plurality of angles.

17. A portable electronic device support comprising:
a base having a front panel and a back panel;
a rectangular frame for a portable electronic device;
a rotational mechanism coupling the frame to the back panel of the base, wherein the rotational mechanism is coupled to the back panel so that a single axis of rotation of the frame is at a position offset from a center of the frame so that the rotational mechanism provides for rotation of the portable electronic device from a landscape orientation to a portrait orientation:
wherein the rotational mechanism is positioned so that the center of the rotational mechanism is shifted along both an X and a Y axis of the frame from the center of the frame;
wherein the center of the rotational mechanism is equally offset from the center of the frame along both the X axis and the Y axis of the frame;
wherein a point of attachment of the rotational mechanism to the back panel is shifted off the center of the frame along an X axis of the frame, so that the frame is still centered about the X axis of the base in both landscape and portrait orientations, even with the rotational mechanism not being centered;
wherein the front panel of the base includes a groove in the front panel of the base to hold the frame at a constant viewing angle of between 60-80 degrees relative to the front panel of the base, in both portrait and landscape orientations;
wherein the support also comprises a case, with the back panel folding with respect to the front panel so that the electronic device is held in-between, and further comprising a latch for securing open ends of the front and back panels together;
wherein the frame is configured to couple to the portable electronic device; and
wherein the rotation mechanism comprises:
a first part coupled to a back side of the frame; and
a second part coupled to a top portion of the back panel, such that the first and second parts engage with each other to couple together and allow rotation relative to each other.

\* \* \* \* \*